US012754379B2

(12) United States Patent
Vishnia et al.

(10) Patent No.: US 12,754,379 B2
(45) Date of Patent: Oct. 6, 2026

(54) SYSTEM FOR MINIMIZING PERTURBATION IN OPTICS DUE TO THERMAL DEFORMATION

(71) Applicant: PLX, Inc., Deer Park, NY (US)

(72) Inventors: Itai Vishnia, Setauket, NY (US); Malcolm Humphrey, Hicksville, NY (US)

(73) Assignee: PLX, Inc., Deer Park, NY (US)

( * ) Notice: Subject to any disclaimer, the term of this patent is extended or adjusted under 35 U.S.C. 154(b) by 290 days.

(21) Appl. No.: 18/643,347

(22) Filed: Apr. 23, 2024

(65) Prior Publication Data

US 2024/0361537 A1 Oct. 31, 2024

Related U.S. Application Data

(60) Provisional application No. 63/498,143, filed on Apr. 25, 2023.

(51) Int. Cl.

| | |
|---|---|
| ***G02B 6/32*** | (2006.01) |
| ***G02B 6/38*** | (2006.01) |
| ***G02B 7/00*** | (2021.01) |
| ***G02B 7/02*** | (2021.01) |
| ***G02B 19/00*** | (2006.01) |

(52) U.S. Cl.
CPC ......... *G02B 6/3853* (2013.01); *G02B 6/3825* (2013.01); *G02B 7/008* (2013.01); *G02B 7/02* (2013.01); *G02B 19/0014* (2013.01)

(58) Field of Classification Search
CPC .... G02B 6/3853; G02B 6/3825; G02B 7/008; G02B 7/02; G02B 19/0014; G02B 6/262; G02B 6/32; G02B 27/30; G02B 7/028
See application file for complete search history.

(56) References Cited

U.S. PATENT DOCUMENTS 6,821,027 B2 * 11/2004 Lee ...................... G02B 6/4283 385/94
9,645,336 B2 * 5/2017 Benjamin ............ G02B 6/4292
2009/0129420 A1 5/2009 Regaard et al.
2013/0135026 A1 5/2013 Bleier et al.
(Continued)

OTHER PUBLICATIONS

R.E. Taylor, CINDAS Data Series on Materials Properties, Thermal Expansion of Solids, vol. 1-4, ASM International, 1998. (9 pages).
(Continued)

*Primary Examiner* — Jennifer Doan
(74) *Attorney, Agent, or Firm* — ICE MILLER LLP; Safet Metjhaic

(57) ABSTRACT

An apparatus for collimating or focusing a coherent light beam without beam misalignment or beam focal point drift due to thermal deformation. The apparatus includes an optical component made of a material having an optical coefficient of thermal expansion and an optomechanical component having an optical support configured to hold the optical component. The optical support is made of a material having an optomechanical coefficient of thermal expansion, wherein the optical coefficient of thermal expansion and the optomechanical coefficient of thermal expansion are selected such that the optical component and the optomechanical component expand or contract as a single entity under varying temperatures.

20 Claims, 6 Drawing Sheets

(56) References Cited

U.S. PATENT DOCUMENTS

| | | | | |
|---|---|---|---|---|
| 2014/0029010 | A1 | 1/2014 | Bleier et al. | |
| 2020/0292756 | A1* | 9/2020 | Langseth | G02B 6/2551 |

OTHER PUBLICATIONS

M. Aspelmeyer, T. J. Kippenberg, and F. Marquardt, "Cavity optomechanics," Rev. Mod. Phys., vol. 86, No. 4, p. 1391, 2014. https://doi.org/10.1103/revmodphys.86.1391. (62 pages).

"Thermal expansion linear expansion coefficients", https://www.engineeringtoolbox.com/linear-expansion-coefficients-d_95.html (15 pages).

"Properties of Fused Silica", https://www.qsiquartz.com/properties-fused-silica/ (7 pages).

International Search Report and Written Opinion issued in PCT/US2024/025861, mailed Jul. 24, 2024. (9 pages).

* cited by examiner

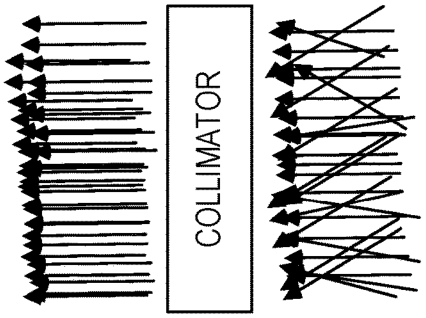
Fig. 1
Fig. 2
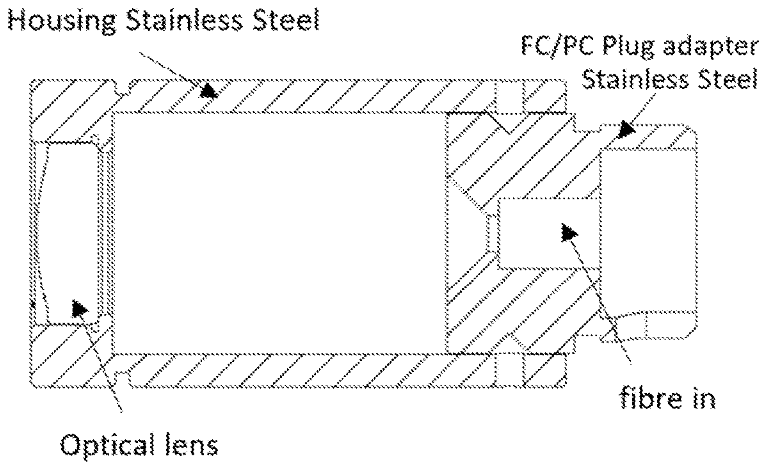
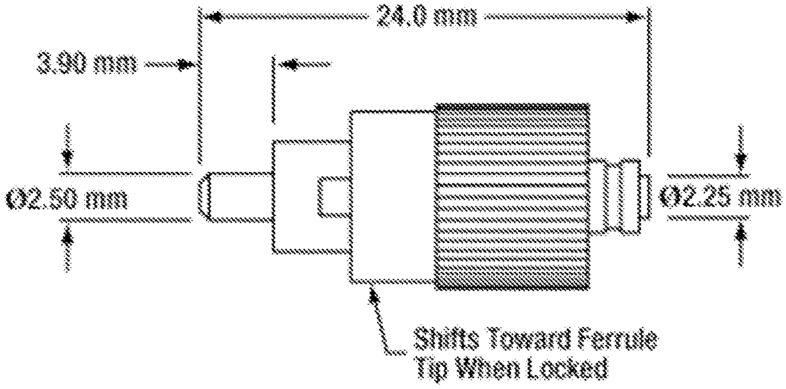
Fig. 3

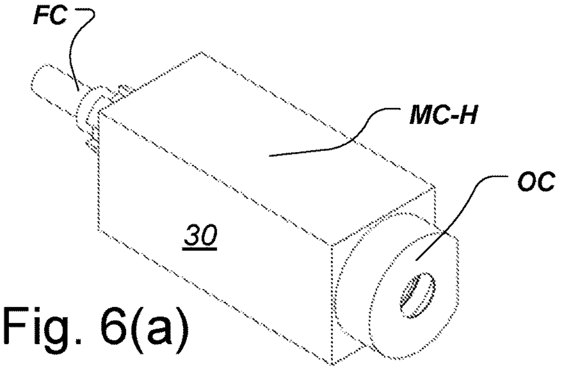
Fig. 6(a)
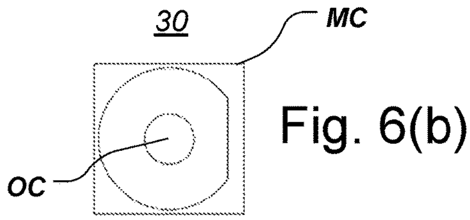
Fig. 6(b)
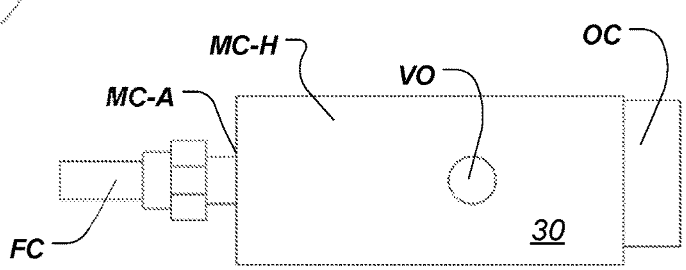
Fig. 6(c)
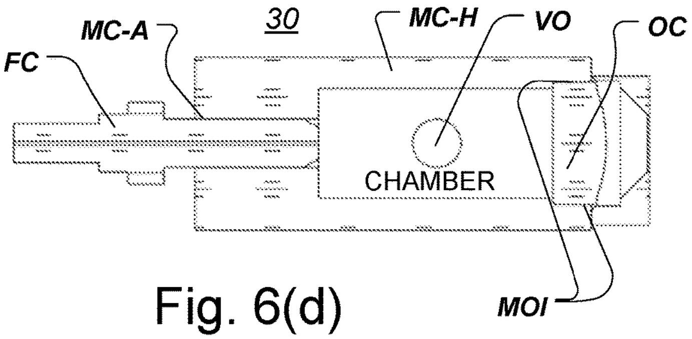
Fig. 6(d)
Fig. 7
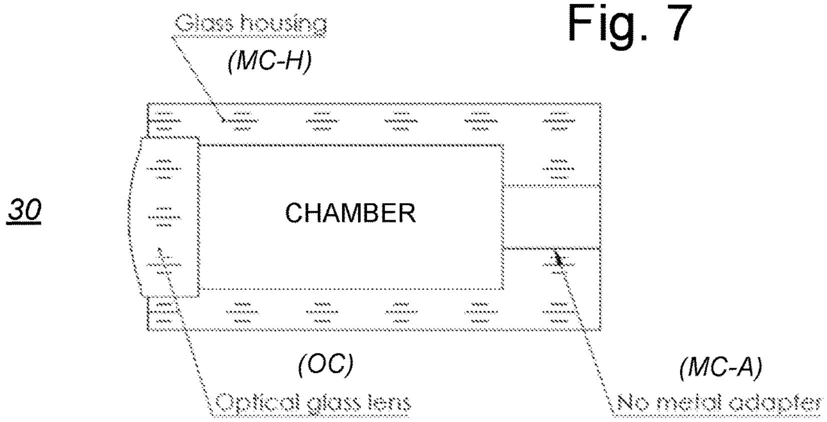

SYSTEM FOR MINIMIZING PERTURBATION IN OPTICS DUE TO THERMAL DEFORMATION

CROSS REFERENCE TO RELATED APPLICATIONS

This application is entitled to and hereby claims priority under 35 U.S.C. § 119 (e) to provisional U.S. patent application, Ser. No. 63/498,143, filed Apr. 25, 2023, titled, "System for Minimizing Perturbation in Optics Due to Thermal Deformation," which is hereby incorporated herein in its entirety.

TECHNICAL FIELD

The present disclosure relates generally to optics and laser technology, and more particularly to a device and an optical system for collimating light energy.

BACKGROUND

A collimator is a device that narrows and/or parallelizes a beam of particles or waves. An example of a commonly known collimator is a mirror or a lens. FIG. 1 shows a schematic diagram of a collimator and its operation in collimating scattered light rays into substantially parallel light rays. Although not shown in FIG. 1, the collimator can be configured such that a diameter of the aggregate of the output rays is significantly smaller than a diameter of the aggregate of the input rays, thereby increasing the amount of energy for a given area size.

Collimators are used in a wide variety of applications, ranging from gun sights to calibration of optical devices, among numerous other things. Collimators are particularly important in metrology and other disciplines where accuracy and alignment of optical components play a key role. Such devices are frequently used for monitoring angular movement or displacement over time, and for checking angular position repeatability in mechanical systems. Collimators can be of critical importance where it is necessary to detect minute angular deviations by measuring a reflected light beam.

The accuracy of collimators can, however, change over time or when used under varying ambient conditions. In certain applications, such as, for example, in geothermal borehole drilling, optical equipment can undergo pressure and temperature changes from 14.7 psi and 0° F., respectively, on Earth's surface to an excess of 3,200 psi and 700° F., respectively, at the bottom of a borehole, at a depth of about 40,000 feet. In other applications, such as scientific exploration, optical equipment can undergo changes in temperature ranging from −128.6° F. (at Vostok Station in Antarctica) to 134° F. (in Death Valley, California), and pressure changes ranging from 4.35 psi (at 29,032 feet, on summit of Mount Everest), or less, to 6,000 psi (at about 12,500 feet, at the site of the Titanic wreck), or greater (for example, the bottom of Mariana Trench is 36,200 feet). Optical equipment that experiences extreme temperature or pressure changes can undergo deformation that deteriorates the equipment's performance.

For instance, in optical systems, it is possible for an optical component to absorb sufficient energy from a light source or other external source, to result in thermal deformation of the component, thereby changing, for example, the size and reflect or refractive index of the component. Such changes can render the optical system useless for certain applications.

SUMMARY

The present disclosure provides a technological solution that addresses and minimizes perturbation caused by thermal deformation in an optical system. The technological solution includes the system, method, or device provided by this disclosure.

According to an aspect of the disclosure, an apparatus is provided for collimating or focusing a coherent light beam without beam misalignment or beam focal point drift due to thermal deformation. The apparatus comprises: an optical component made of a material having an optical coefficient of thermal expansion; and an optomechanical component having an optical support configured to hold the optical component, the optical support being made of a material having an optomechanical coefficient of thermal expansion.

The optical coefficient of thermal expansion and the optomechanical coefficient of thermal expansion can be selected such that the optical component and the optomechanical component expand or contract as a single entity under varying temperatures. The optical coefficient of thermal expansion can be the same as the optomechanical coefficient of thermal expansion.

The optical element can comprise a lens. The lens can include a spherical plano-convex lens or an aspheric lens.

The optomechanical component can comprise a housing. The housing can comprise the optical support. The optical support can comprise a recessed portion configured to surround and hold the optical component. The recessed portion can be configured to surround and hold an entire perimeter of the optical component.

The optomechanical component can comprise at least one of a fibre adapter and a fibre connector.

The at least one of the optical coefficient of thermal expansion and the optomechanical coefficient of thermal expansion can be about $7\times10^{-6}$ $K^{-1}$, or less.

The at least one of the optical coefficient of thermal expansion and the optomechanical coefficient of thermal expansion can be about $0.27\times10^{-6}$ $K^{-1}$.

According to a further aspect, an apparatus is provided for collimating or focusing a coherent light beam without beam misalignment or beam focal point drift due to thermal deformation, the apparatus comprising: an optical component made of a material having an optical coefficient of thermal expansion; and an optomechanical component having an optical support configured to hold the optical component, the optomechanical component and the optical support being made of a material having an optomechanical coefficient of thermal expansion, wherein the optical coefficient of thermal expansion can substantially the same as the optomechanical coefficient of thermal expansion.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a monolithic part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 1 shows a schematic diagram of a prior art collimator.

FIG. 2 shows a side cross-cut view of a state-of-the art collimator.

FIG. 3 shows an example of a metal fiber connector.

FIGS. 6(*a*)-6(*d*) show various views of an embodiment of a collimator, including a perspective view (FIG. 6(*a*)), a front view (FIG. 6(*b*)), a side view (FIG. 6(*c*)), and a side, cross-section cut view (FIG. 6(*d*)).

FIG. 7 shows a side cross-cut view of another embodiment of a collimator.

Figure 4A:
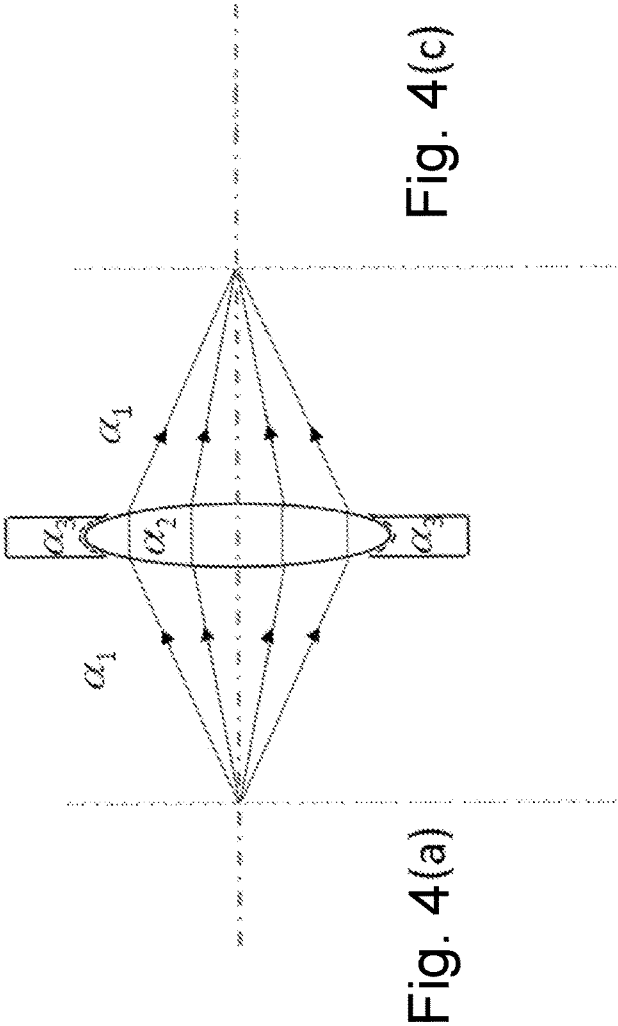
FIGS. 4(*a*)-4(*d*) show nonlimiting examples of operation of a simple optical component.
Figure 4B:
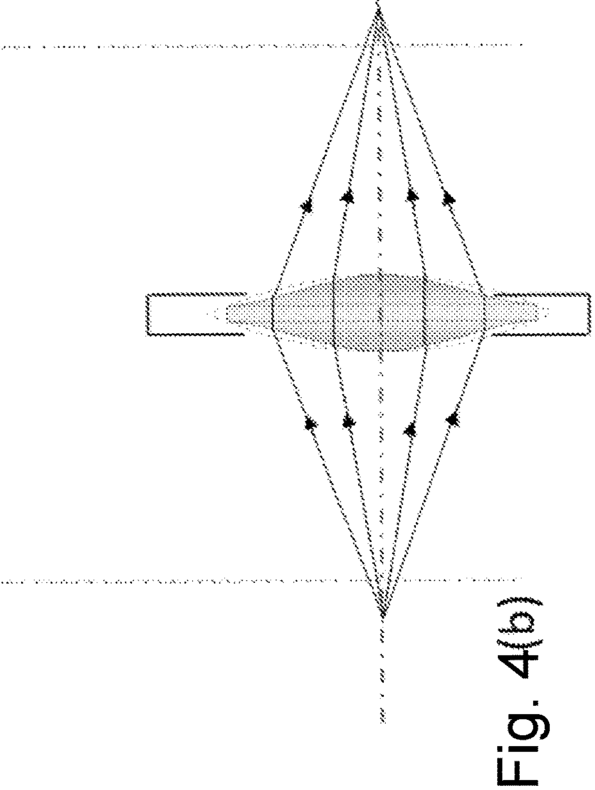
Figure 4C:
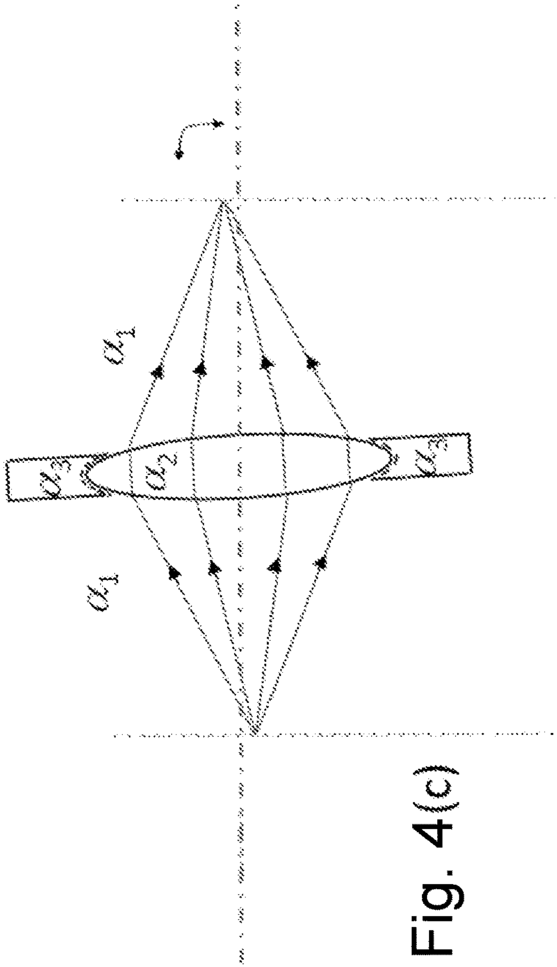
Figure 4D:
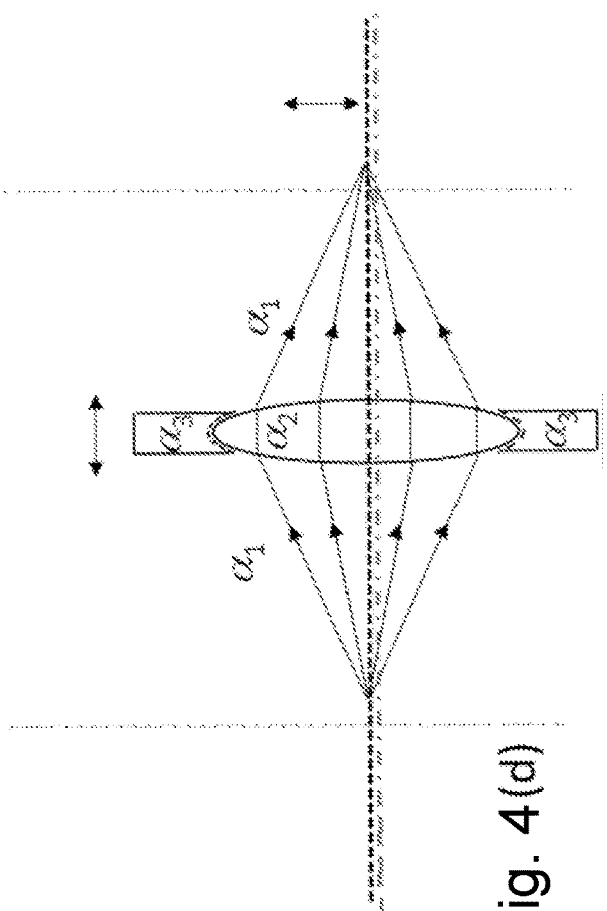

The present disclosure is further described in the detailed description that follows.

DETAILED DESCRIPTION

The disclosure and its various features and advantageous details are explained more fully with reference to the nonlimiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar monolithic parts throughout the several views of the drawings.

Thermal deformation of an optical component can occur when the component expands with heat or contracts with cold, depending on the temperature change $\Delta T$, where $\Delta T = T_1 - T_0$, and $T_0$ is the initial temperature of the optical component and $T_1$ is the temperature of the optical component at a later time, after experiencing a temperature change resulting from absorbing energy from an energy source such as a coherent light beam or other external energy source, or releasing energy, such as, for example, when being moved to a cold environment. In an optical system having one or more optical components, such as, for example, the optical system OS (shown in FIGS. 5(*a*) and 5(*b*)) or the optical system 30 (shown in FIGS. 6(*a*)-6(*d*) or FIG. 7), the optical component can absorb enough energy from energy source such as a coherent beam light source or external energy source to undergo thermal deformation, including undergoing a change in shape, size, position, reflective index, refractive index, or effective focal length. Such perturbations, in turn, will cause drift, scatter, and other negative effects in the light beam that the optical component transmits, refracts, directs, focuses, or otherwise operate on the light beam.

Thermal deformation can be expressed by a coefficient of linear thermal expansion CTE value (or $\alpha$). The thermal expansion of uniform objects is proportional to the temperature change within a temperature range. The CTE value $\alpha$ is defined by:

$$\alpha = \frac{1}{L} \cdot \frac{\Delta L}{\Delta T}$$

where $\Delta L$ is an expansion or contraction value of an article (in unit of length), L is the length of the article before heating or cooling (in unit of length), and $\Delta T$ is the temperature difference (in K). The coefficient $\alpha$ has unit of reciprocal temperature ($K^{-1}$ or $^\circ$ $C.^{-1}$) such as μm/m·K (or ° C.) or $10^{-6}$/K (or ° C.). Since different materials expand by different amounts, thermal deformation can generate detrimental stress when a system includes components made with different materials. Such stress results in different kinds of position displacement in optical alignment.

The disclosure proves a technological solution that minimizes the perturbations caused by thermal deformation in optical components in applications such as, for example, collimation, focusing, imaging, and metrology, among others. The technological solution includes a unique design that creates a self-consistent optical system that reduces miscollimation, misalignment and defocus caused by the thermal deformation of the optical components in an optical system.

In optical systems, the optical path of collimation and focusing tends to be of primary importance. The use of proper optomechanical components can greatly enhance the interaction among the optical components and mechanical parts in such optical systems.

FIG. 2 shows a side cross-cut view of a state-of-the art single lens fibre collimator made of optical components (optical lens) and optomechanical components (stainless-steeling housing and stainless-steel adapter) having significantly different $\alpha$ values. The collimator has a single optical lens installed at a distal end of the stainless-steel housing and a stainless-steel ferrule connector (FC)/physical contact (PC) plug adapter installed at the other distal end of the housing. The plug adapter includes a recess configured to receive and hold a fibre when connected to the adapter. The inventors have discovered that the optical components in the collimator, as well as other optical systems, is susceptible to thermal deformation and detrimental stress since the device is made of materials having different $\alpha$ values. In particular, the collimator includes an optical lens that might have $\alpha = 7 \times 10^{-6}$ $K^{-1}$ for N-BK7 (or $\alpha = 0.27 \times 10^{-6}$ $K^{-1}$ for fused silica) and a mechanical part (the stainless-steel housing and plug adapter) having $\alpha$ ranging up to $17.3 \times 10^{-6}$ $K^{-1}$ for Austenitic stainless-steel type 304, the most common austenitic stainless steel, or greater for other materials.

FIG. 3 shows a nonlimiting example of a state-of-the art metal fibre adapter that can be coupled to a collimator, such as, for example, the collimator shown in FIG. 2. State-of-the art collimators, like the one shown in FIG. 2, have optomechanical components that require a metal fibre plug adapter, like the one shown in FIG. 3. The metal fibre plug adapter also requires a fastener having a mating connector made of metal, which, importantly, operates as a hard stop to control the fibre engaging position relative to the focal point of the optical glass lens. This is critical for collimation of a light beam. Since the different materials of the collimator and fibre plug adapter expand/contract at different rates, as the optical system undergoes significant changes in temperature, the system may experience thermal drift, de-positioning, or de-centering of the light beam, especially potential misalignment between the fibre and the connector caused by the different CTE values between the materials.

FIGS. 4(*a*) to 4(*d*) show views of a simple lens and support under varying thermal conditions, including: FIG. 4(*a*) shows the lens in a steady state and in perfect alignment without thermal deformation; FIG. 4(*b*) shows the lens when the support and housing (for example, stainless-steel housing in FIG. 2) are cooled, causing the support to squeeze the lens; FIG. 4(*c*) shows the lens tilted due to pressure from the support and housing resulting from temperature changes; and FIG. 4(*d*) shows the lens decentered with a drift due to thermal deformation. As seen in the Figures, the various parts of the optical system can have a variety of CTE values, including, for example, $\alpha_1$, $\alpha_2$, and $\alpha_3$.

Referring to FIGS. 2 and 3, the optomechanical components (for example, support, housing, adapter, fastener, or other holding/fixing mechanism) are made of materials, such as, for example, aluminum, steel, stainless-steel, or other metals, which have a higher CTE value than that of the materials that make up the optical component(s). This difference in CTEs values can, when the optical system undergoes significant temperature changes, cause the optical component to become decentered, tilted, or experience other negative effects, such as, for example, thermal drift and changes to reflective or refractive.

Referring to FIGS. 4(*a*) to 4(*d*), considering the optomechanical components (for example, the holding/fixing structures) in state-of-the-art optical systems (for example, shown in FIGS. 2-3) are made of materials having CTE values $\alpha_3$ that are significantly higher than the CTE values $\alpha_2$ of the optical components (for example, glass lenses), the systems can experience negative effects such as, for example, focal length drift, misalignment, scatter, de-focusing, de-positioning, or de-centering of light beams in the system.

Referring to the collimator in FIG. 2, since the optomechanical components (metal housing and metal adapter) are positioned to hold the optical component (lens) snug, without space to expand, the optomechanical component could "squeeze" the optical component to failure due to thermal deformation, as seen in FIG. 4(*b*). Other optical component deficiencies caused by thermal deformation are seen, including tilt (shown in FIG. 4(*c*)), decentering and drifting (shown in FIG. 4(*d*)), which is shown in comparison with the optical component in perfect alignment without thermal deformation (shown in FIG. 4(*a*)).

The tilt shown in FIG. 4(*c*) and the drift shown in FIG. 4(*d*) may not be easily detectable in certain applications because the thermal deformation in the size or shape of the optical component caused due to different CTE values under varying temperature conditions can be very small in comparison to the original size/shape of the optical component. Given that the size of optical components in optical systems are usually on the order of millimeters (mm), the thermal perturbation may be on the order of nanometers (nm), which can be within the range of tolerance in certain applications of optical systems. However, in many applications, such as, for example, collimation, focusing, and imaging, any optical squeezing caused by thermal deformation (shown in FIG. 4(*b*) can be problematic and negatively affect accuracy or precision of the optical system. The optical systems shown in FIGS. 5(*a*)-5(*b*), or 6(*a*)-6(*d*), or 7, minimize such negative effects, since the optical squeezing is minimized because the optomechanical components have the same or similar CTE values as the optical components.

The disclosure provides a technological solution that overcomes deficiencies related to thermal deformation in optical systems, such as, for example, collimation optical systems, focusing optical systems, and the like. The technological solution includes constructing the optomechanical components that hold, support, engage, contact, or otherwise might hold, support, engage, or contact an optical component under varying temperature conditions using a material that has a CTE value the same or similar to that of the optical component(s). While both the optomechanical components and the optical components could still expand or contract due to temperature changes, all of the components will undergo change as a single unit (or entity), with their shape, size, volume changing as one piece.

Figure 5A:
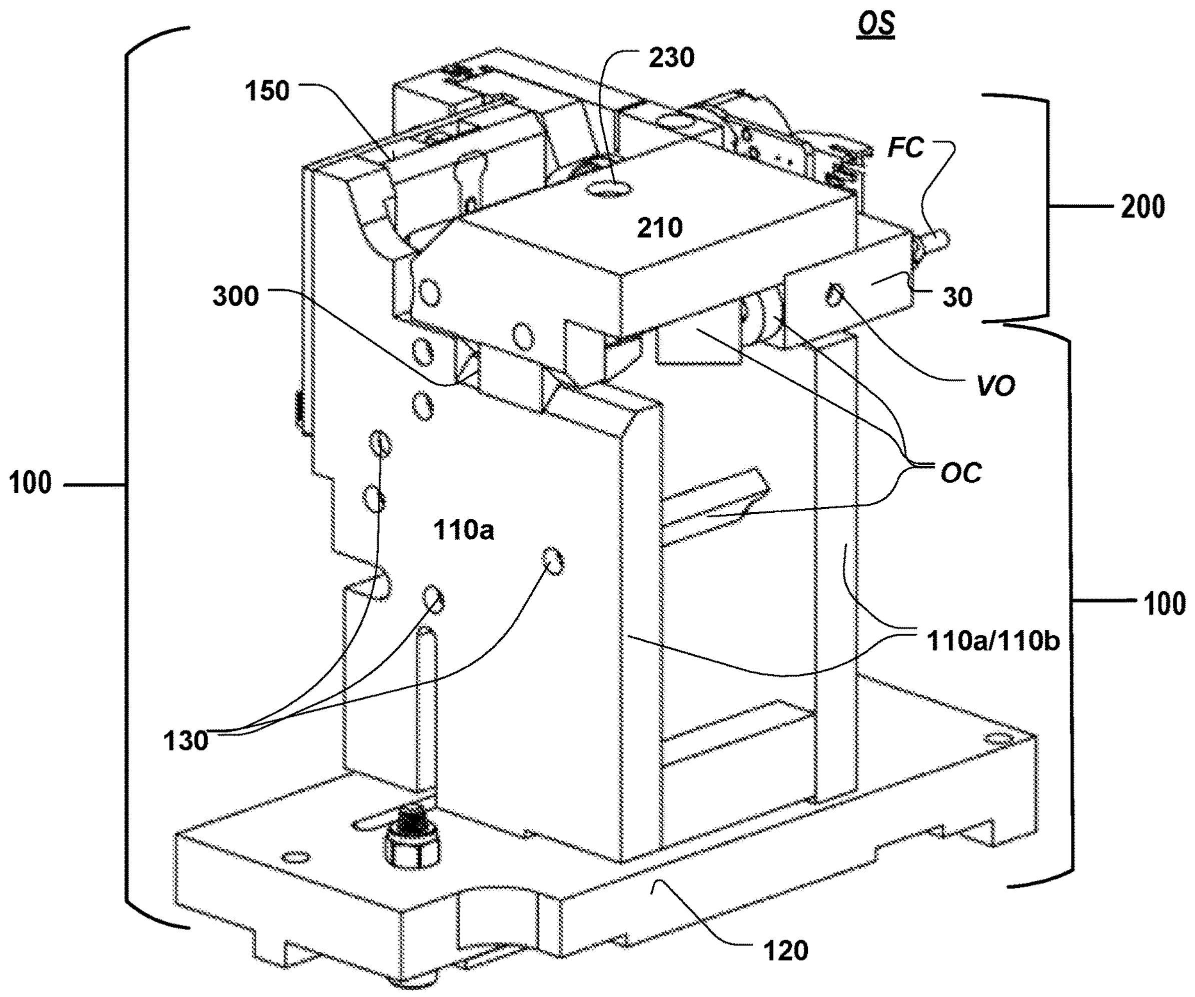
FIGS. 5(*a*) and 5(*b*) show view and perspective exploded views, respectively, of an optical system.
Figure 5B:
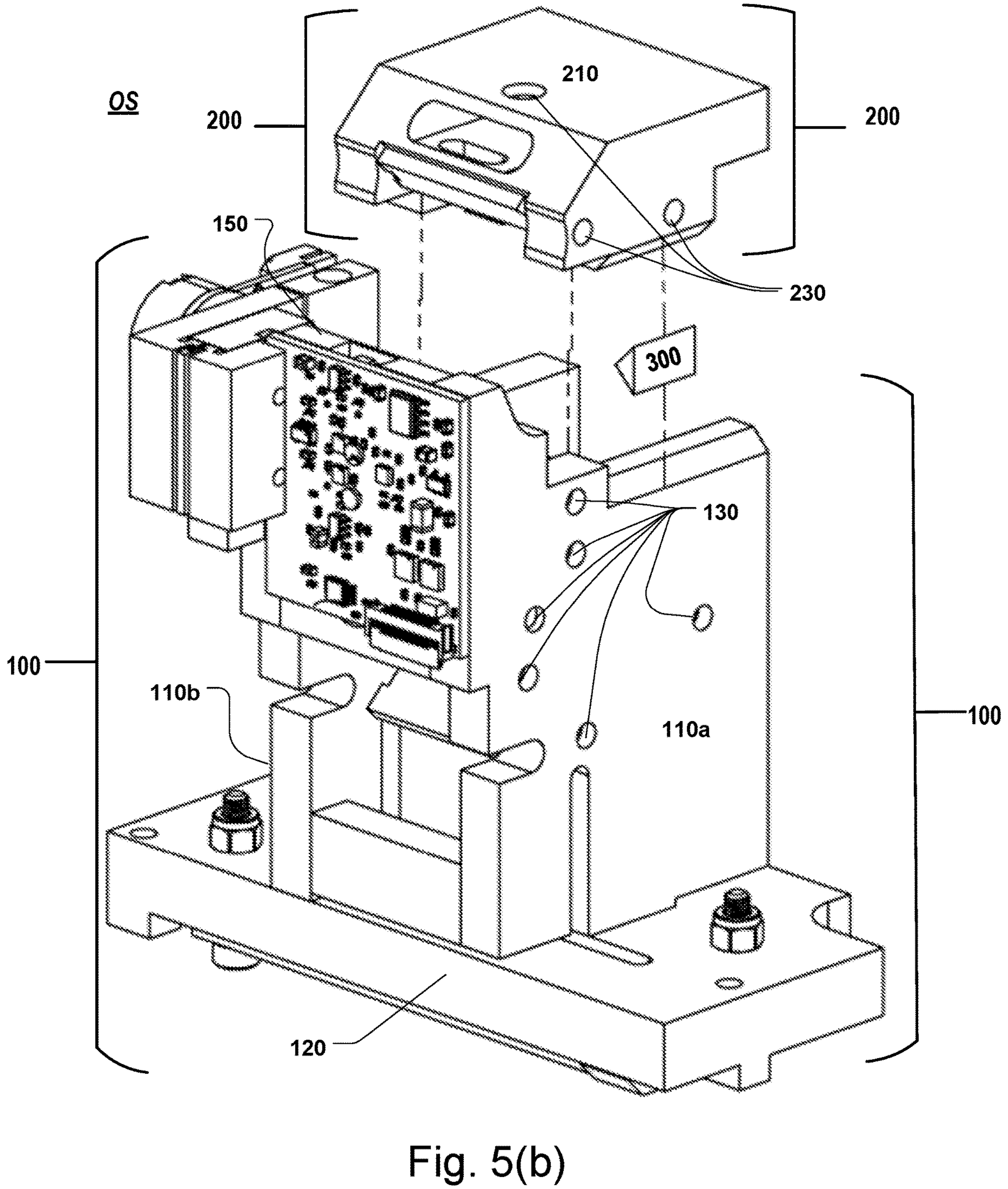

FIGS. 5(*a*) and 5(*b*) show a perspective view and a perspective exploded view of an embodiment of an optical system OS, constructed according to the principles of the disclosure. As seen in FIG. 5(*b*), the OS includes a modular solution that integrates a first monolithic part 100 and a second monolithic part 200, each of which can include PLX's Monolithic Optical Structure Technology® (or MOST®). The OS includes a coherent energy source that can be preinstalled and optically aligned with the optical components OC in the second monolithic part 200. The first monolithic part 100 includes a plurality of preinstalled and pre-aligned optomechanical components MC, including a pair of support members 110*a*, 110*b*, a base 120, and a sensor mounting base 150. Similarly, the second monolithic part 200 includes preinstalled and pre-aligned optomechanical components such as a body 210 that include connection regions for connecting to corresponding connection regions on the first monolithic part 100.

The OS includes optical components OC, optomechanical components MC, and electrical components (not shown) for generating, shaping, and directing coherent light beams, including for applications, such as, for example, metrology, collimation, focusing, and imaging. The OS includes a coherent light energy source (not shown), a controller (not shown), a beam steering device, optical components OC such as lenses and mirrors, and optomechanical components MC such as the support members 110*a*, 110*b*, base 120, sensor mounting base 150, among other things. All of the optical components OC and optomechanical components MC in the first monolithic part 100 and the second monolithic part 200 are preinstalled and optically aligned, before the OS is assembled. All optomechanical components MC (or parts thereof) that contact, hold, support, or engage, or that might contact, hold, support, or engage an optical component OC in the respective monolithic part 100 or 200 are made of a material having a CTE value that is the same as, or similar to, that of the optical component OC, this is also the case for the connecting portions of the first monolithic part 100 and the second monolithic part 200, as well as an adjustable support 300 that can be included to facilitate optical alignment of the first and second monolithic parts 100 and 200, respectively. The modular structure of the OS facilitates easy assembly or replacement of monolithic parts.

In at least one embodiment of the OS, optomechanical component (adjustable support) 300 includes a pair of surfaces that engage and support corresponding bevel portions on the first and second monolithic parts 100, 200, to provide a third point of contact between the first monolithic part 100 and the second monolithic part 200. The adjustable support 300, including the contact surfaces, is configured to facilitate optical alignment of the first monolithic part 100 with the second monolithic part 200 during assembly such that the optical components OC in each of the first and second monolithic parts 100, 200 are properly aligned.

As seen in FIG. 5(*a*), the support member 100*a* includes a plurality of pin holes 130, each configured to receive and securely hold an end portion, such as, for example, a mounting pin, of an optical component OC or optomechanical component MC installed in the first monolithic part 100. The OC and MC, including their respective end portions, are made of a material having the same or a similar CTE value. The support member 100*b* can include a plurality of pin holes (not shown) corresponding to the plurality of pin holes 130 on the support member 100*a*, with each pin hole on the support member 100*b* positioned and aligned with a corresponding pin hole 130 and configured to receive and securely hold another end portion, such as, for example, another mounting pin, of the OC, which can include, for example, a mirror, a lens, a lens assembly, a collimator, a beam splitter, or a mirror, or the MC to be preinstalled and pre-aligned in the monolithic part 100, such that the components are a part of the monolithic structure of the first monolithic part 100 and have the same or similar CTE values.

The second monolithic part 200 can include a plurality of pin holes 230 in the body 210. Each pin hole 230 is configured to receive and securely hold a portion, such as, for example, a mounting pin, of an optical component OC such as a mirror, a beam splitter, or the collimator 30 (shown in FIG. 6(*a*) or 7), or an optomechanical component MC. In the monolithic part 200, the OC can include, for example, a collimator, a mirror, a lens, a beam splitter, a mirror, or other optical component, to be preinstalled and pre-aligned in the monolithic part 200, such that the component is a monolithic component of the second monolithic part 200.

FIGS. 6(*a*) to 6(*d*) show various views of an embodiment of a collimator 30, constructed according to the principles of the disclosure: FIG. 6(*a*) shows a perspective view of the collimator 30; FIG. 6(*b*) shows a front (or lens) view of the collimator 30; FIG. 6(*c*) shows a side view of the collimator 30; and FIG. 6(*d*) shows a side cross-cut view of the collimator 30.

The collimator 30 includes an optical component OC comprising a lens and an optomechanical component MC comprising a housing MC-H, an adapter MC-A, and a fibre connector FC. The adapter MC-A is configured to receive the fibre connector FC. The housing MC-H includes a vent opening VO that allows air to escape. The vent VO includes a hole, which in certain applications, can be connected to a vacuum tube (not shown) to extract air from a chamber in the housing MC-H. As seen in FIG. 6(*d*), the optical component OC (lens) and the optomechanical components MC (housing MC-H, adapter MC-A, fibre connector FC) are all made of a material having the same or substantially the same CTE value. In at least one embodiment, the material used to make the collimator 30, including the OC (lens) and MC (housing, adapter, fibre connector) is glass.

FIG. 7 shows an embodiment of a fixed focus collimator 30, constructed according to the principles of the disclosure. In the fixed focus collimator, the optomechanical components, which includes the housing and adapter, is made using the same material (for example, glass) as the optical component. Since the optomechanical components and the optical component are made of materials having the same, or substantially the same, CTE values, the optomechanical component and the optical component will undergo expansion/contraction as a single entity, such that the optical path will remain constant under varying temperatures, thereby minimizing an optical squeezing, tilt, decentering, or drifting due to thermal deformation in applications such as, for example, collimation, focusing, imaging, or the like.

Figure 8:
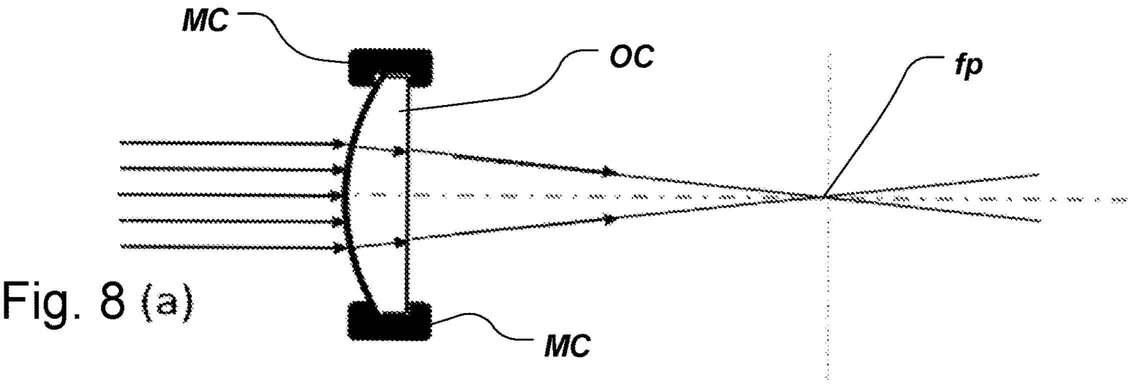
FIGS. 8(*a*)-8(*d*) show nonlimiting examples of operation of an optical component.
Figure 8:
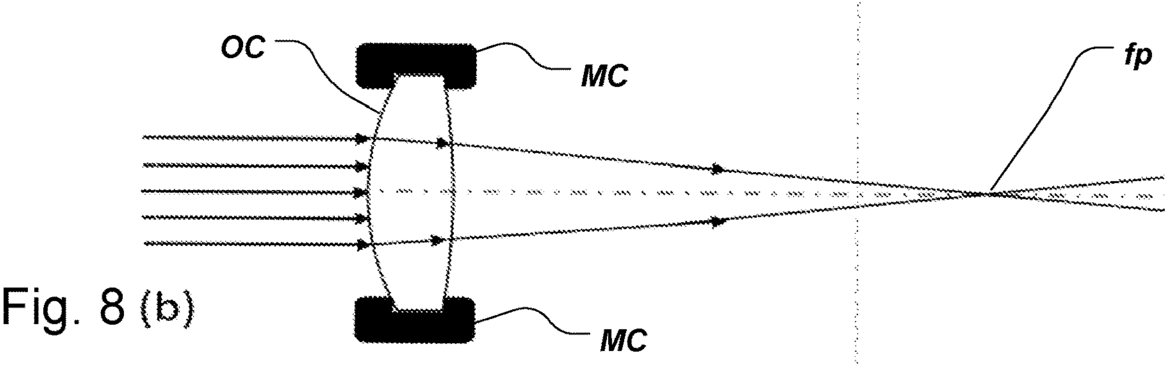
Figure 8:
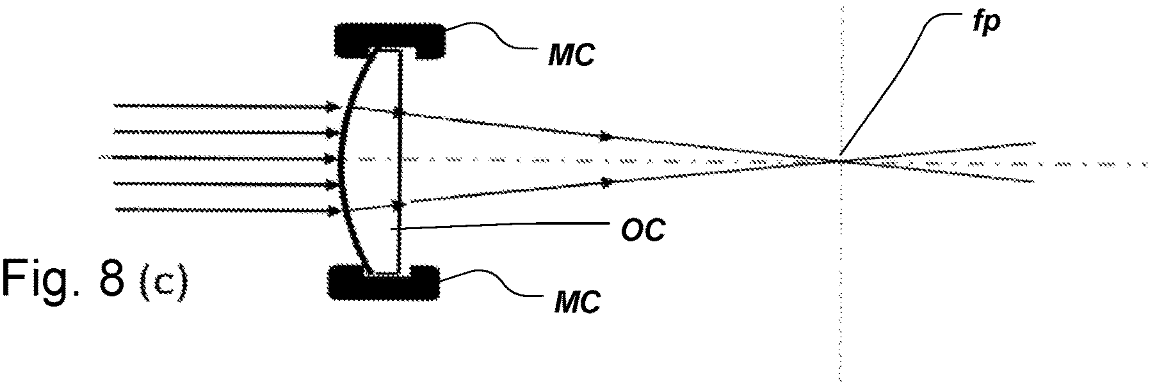
Figure 8:
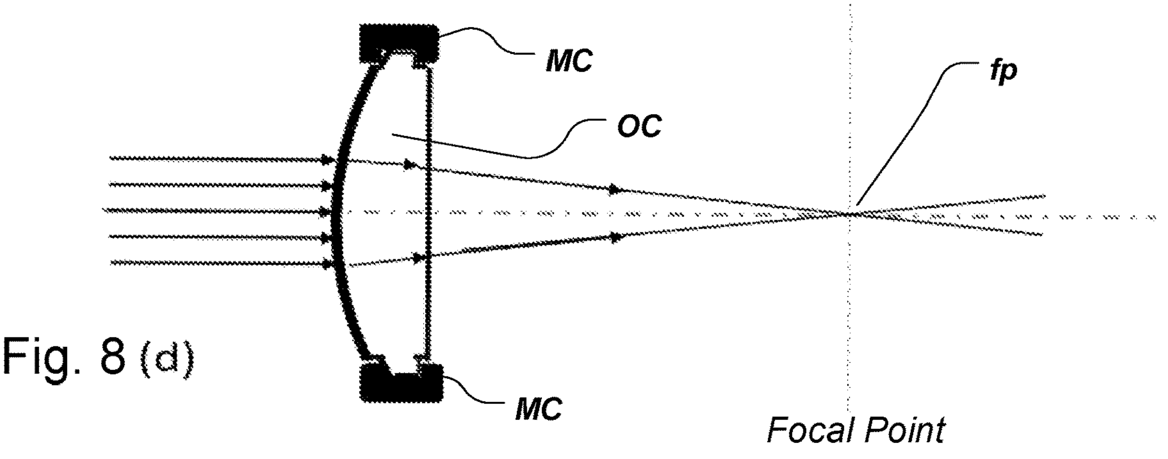

FIGS. 8(*a*)-8(*d*) show various examples of operations of various collimators, wherein: FIG. 8(*a*) shows an example of operation of the collimator 30 (shown in FIG. 6(*a*) and FIG. 7); FIG. 8(*b*) shows an example a focal point shift in the collimator having an optomechanical structure made of metal (for example, shown in FIG. 2); FIG. 8(*c*) shows an example of operation of the collimator 30, wherein the optical component OC undergoes contraction without any shift in focal point; and FIG. 8(*d*) shows an example of operation of the collimator 30, wherein the OC undergoes expansion without any shift in focal point. In each of the illustrated examples the optical component OC can be a single spherical plano-convex lens or an aspheric lens.

In FIG. 8(*a*), the spherical plano-convex lens OC is made of a material having a CTE value that is the same, or substantially the same, as the CTE value of the material used to make the housing MC (as seen, for example, in FIGS. 6(*d*) and 7). The optical component OC is employed for focusing light or an image at a focal point, as shown by the vertical dotted line, labeled "Focal Point." As seen in FIG. 8(*a*), the OC is perfectly aligned, without any thermal deformation or spherical aberrations. The focal length f of the lens along the optical axis can be calculated as follows:

$$f = \frac{R}{(n_g - 1)} \tag{2}$$

where $n_g$ is the refractive index of the glass, R is the radius of curvature for the left surface of the OC. To calculate the focal length f of a plano-convex lens, the radius of curvature for the right surface is set to be ∞.

FIG. 8(*b*) shows an example of operation of the optical component OC in the collimator of FIG. 2, which has a glass optical lens and a metal optomechanical component MC (stainless-steel housing and stainless-steel adapter). Since optical components and optomechanical components can absorb energy from incident light, or heat from the surrounding environment, the absorbed energy results in the expansion of the optical and optomechanical components. As seen in FIG. 8(*b*), since the OC is a glass lens and the MC is a metal housing having significantly different CTE values, the lens exhibits thermal deformation that alters its focal point. Under such conditions, the glass and the metal both expand but to different lengths, causing the metal to squeeze the glass lens as the temperature increases. The lens deformation resulting from the squeezing causes the curvatures of the surfaces of the lens to change. Even with the same angle of incidence of the rays, a tiny perturbation of the curvatures of the lens causes the transmitted rays to be deflected significantly from their initially trajectories, resulting in a significant change in the focal length of the lens. Assuming a thin lens for the OC, the focal length in FIG. 8(*b*) is modified to be:

$$\frac{1}{f} = (n_g - 1)\left(\frac{1}{R_1} - \frac{1}{R_2}\right) \tag{3}$$

where $n_g$ is the refractive index of the glass, $R_1$ and $R_2$ are the radii of curvature for surfaces of the left side and the right side, respectively, wherein $R_1 \approx R$ in equation (2).

Equations (2) and (3) indicate that the difference in CTE values between the glass OC and the metal MC (the state-of-the art optomechanical design) interferes with the optical path remarkably.

In various embodiments, the optical system (including the OS shown in FIGS. 5(*a*), 5(*b*) and the collimator 30 shown in FIGS. 6(*a*)-6(*d*) or 7) is constructed of the same materials, or different materials with the same, or substantially the same, CTE values for both the optical and the optomechanical components in the system. The interface regions between each optical component and the portions of the optomechanical components that contact, hold, support, or engage, or that might do any of the foregoing under varying temperature conditions to, the optical component are constructed such contacting parts and components contract and/or expand in shape, size, and volume as a single entity or unit.

For illustrative purposes, the size of the optical component is overstated in FIG. 8(*c*) and FIG. 8(*d*) to show contraction and expansion changes, respectively, in shape or size of the optical component OC relative to the portion(s) of the optomechanical component MC that contacts, holds, supports, or engages the optical component OC in position. In FIG. 8(*c*), the optical component OC is shown as reduced in size/shape under contraction conditions such as reduced temperature. Alternatively, the figure also shows a scenario where the optomechanical component MC is increased in size/shape due to expansion conditions such as increased temperature.

In FIG. 8(*d*), the optical component OC is shown as enlarged in size/shape under expansion conditions such as increased temperature. Alternatively, FIG. 8(*d*) also shows a scenario where the optomechanical component MC is decreased in size/shape due to contraction conditions such as lowered temperature.

In real-world applications, such as those carried out below sea-level, on Earth, or in the various layers of Earth's atmosphere, including the exosphere, the changes in size or shape of optomechanical components MC made of materials such as metal (for example, $\alpha=17.3\times10^{-6}$° C.$^{-1}$ for stainless steel) can range on the scale of about a nanometer (nm) per degree Centigrade change (nm/° C.), compared to about a millimeter (mm) per degree Centigrade change (mm/° C.) for optical components OC (for example, $\alpha=5.9\times10^{-6}$° C.$^{-1}$ for hard glass) under certain conditions. While such degrees of change in the shapes or sizes of optical components OC and optomechanical components MC may not be visible to the naked eye in real-world applications of optical systems using such optical and optomechanical components, the effects of such changes can be unacceptable, or at minimum undesirable, in certain applications, such as, for example, in the OS (shown in FIGS. 5(*a*) and 5(*b*)), or in laser beam collimation, laser focusing, laser-based metrology, or the like, where it can be critical to have precise and accurate coherent light beam shaping and steering.

In the optical systems constructed according to the disclosure, by using materials having the same or similar CTE values to make the optical and optomechanical components, the components will undergo the same or similar changes in shape or size under varying temperature conditions, thereby avoiding destructive changes (such as, for example, squeezing, de-centering, de-positioning, or other aberration) that can occur when the optical and optomechanical components are made of materials having very different CTE values.

In the optical system constructed according to the principles of this disclosure, the optical components will maintain their performance properties in applications where the temperature may change by ±400° F., or more, without changes to curvature, position, angle, focal point, or other performance properties of optical components such as, for example, focusing or collimating lenses. As made evident by the relationship in equation (2), the focal length f of such optical components will not shift as the overall optical system undergoes substantial changes in temperature, thereby maintain the focal point of a coherent light beam, without any shift to the focal point as the optical system undergoes significant heating or cooling.

The terms "a," "an," and "the," as used in this disclosure, means "one or more," unless expressly specified otherwise.

The terms "including," "comprising" and their variations, as used in this disclosure, mean "including, but not limited to," unless expressly specified otherwise.

References in the disclosure to "one embodiment," "an embodiment," "an example embodiment," or "example," indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format can be interpreted in a flexible manner to include not only the numerical values explicitly recited as the limits of the range, but also to include all the individual numerical values or sub-ranges encompassed within that range as if each numerical value and sub-range is explicitly recited.

The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G; F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. An apparatus for collimating or focusing a coherent light beam without beam misalignment or beam focal point drift due to thermal deformation, the apparatus comprising:

an optical component made of a material having an optical coefficient of thermal expansion; and an optomechanical component having an optical support configured to hold the optical component, the optical support being made of a material having an optomechanical coefficient of thermal expansion, wherein the optical component comprises a lens, and wherein the optical coefficient of thermal expansion and the optomechanical coefficient of thermal expansion are selected such that the optical component and the optomechanical component expand or contract as a single entity under varying temperatures.

2. The apparatus of claim 1, wherein the optical coefficient of thermal expansion is the same as the optomechanical coefficient of thermal expansion.

3. The apparatus of claim 1, wherein the optomechanical component comprises at least one of a fibre adapter and a fibre connector in optical alignment with the optical component.

4. The apparatus of claim 1, wherein the lens is a spherical plano-convex lens or an aspheric lens.

5. The apparatus of claim 1, wherein the optomechanical component comprises a housing.

6. The apparatus of claim 5, wherein the housing comprises the optical support.

7. The apparatus of claim 1, wherein the optical support comprises a recessed portion configured to surround and hold the optical component.

8. The apparatus of claim 7, wherein the recessed portion is configured to surround and hold an entire perimeter of the optical component.

9. The apparatus of claim 1, wherein the optomechanical component comprises at least one of a fibre adapter and a fibre connector.

10. The apparatus of claim 1, wherein at least one of the optical coefficient of thermal expansion and the optomechanical coefficient of thermal expansion is about $7\times10^{-6}$ $K^{-1}$, or less.

11. The apparatus of claim 1, wherein at least one of the optical coefficient of thermal expansion and the optomechanical coefficient of thermal expansion is about $0.27\times10^{-6}$ $K^{-1}$.

12. An optical system comprising the apparatus of claim 1.

13. An apparatus for collimating or focusing a coherent light beam without beam misalignment or beam focal point drift due to thermal deformation, the apparatus comprising:

an optical component made of a material having an optical coefficient of thermal expansion; and an optomechanical component having an optical support configured to hold the optical component, the optomechanical component and the optical support being made of a material having an optomechanical coefficient of thermal expansion, wherein the optical component comprises a lens, and wherein the optical coefficient of thermal expansion is substantially the same as the optomechanical coefficient of thermal expansion.

14. The apparatus of claim 13, wherein the optomechanical component comprises at least one of a fibre adapter and a fibre connector in optical alignment with the optical component.

15. The apparatus of claim 13, wherein the lens is a spherical plano-convex lens or an aspheric lens.

16. The apparatus of claim 13, wherein the optomechanical component comprises a housing and the optical support is part of the housing.

17. The apparatus of claim 13, wherein the optical support comprises a recessed portion configured to surround and hold the optical component.

18. The apparatus of claim 13, wherein the optomechanical component comprises at least one of a fibre adapter and a fibre connector.

19. The apparatus of claim 13, wherein at least one of the optical coefficient of thermal expansion and the optomechanical coefficient of thermal expansion is about $7\times10^{-6}$ $K^{-1}$, or less.

20. The apparatus of claim 13, wherein at least one of the optical coefficient of thermal expansion and the optomechanical coefficient of thermal expansion is about $0.27\times10^{-6}$ $K^{-1}$.

* * * * *